June 9, 1964  C. H. JOLLY  3,136,388
TELESCOPE DRIVE

Filed Nov. 16, 1960  2 Sheets-Sheet 1

Carl H. Jolly
INVENTOR.

BY *Oliver D. Olson*

Agent

June 9, 1964

C. H. JOLLY 3,136,388

TELESCOPE DRIVE

Filed Nov. 16, 1960

Carl H. Jolly
INVENTOR.

BY Oliver D. Olson
Agent

United States Patent Office 3,136,388
Patented June 9, 1964

3,136,388
TELESCOPE DRIVE
Carl H. Jolly, 15734 SE. Powell, Portland, Oreg.
Filed Nov. 16, 1960, Ser. No. 69,658
14 Claims. (Cl. 185—2)

This invention relates to drive mechanisms, and more particularly to a novel drive for rotating a telescope on its polar axis.

There are many instances, in the use of telescopes, in which it is necessary or desirable to rotate the telescope on its polar axis, at a constant or variable rate. For example, because of the rotation of the earth it is necessary to rotate a telescope on its polar axis at a substantially constant rate of one revolution per day when making long time studies or photographs of celestial bodies. The rate of rotation on the polar axis also should be variable to accommodate the viewing of faster moving objects such as near-by satelites, and this rate of rotation should be readily controllable for viewing objects traveling an eccentric orbit.

Drive mechanisms provided heretofore for the foregoing purposes have not been completely satisfactory. For example, electric drive systems are usable only at locations where an electric supply is available. The escapement mechanism of a mechanical clock drive produces a vibration sufficient to jar the telescope and produce blurred photographs. In addition, drive mechanisms provided heretofore have been quite complicated and therefore too costly for the majority of amateur astronomers.

Accordingly, it is a principal object of the present invention to provide a telescope drive which overcomes the disadvantages enumerated hereinbefore, while affording a high degree of precision of rotation over a substantial range.

Another important object of this invention is the provision of a telescope drive which is of simplified construction for economical manufacture.

The foregoing and other objects and advantages of this invention will appear from the following detailed description, taken in connection with the accompanying drawings in which.

It its basic concept, the telescope drive of the present invention utilizes a variable length lever for controlling the speed of rotation of a shaft which is connected operatively to the polar axis shaft of the telescope and which is driven by a coil spring or other flexible source of power.

Figure 1:
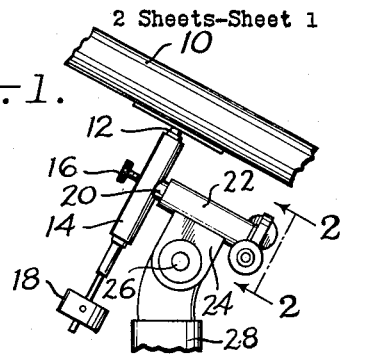
FIG. 1 is a fragmentary view in side elevation of a telescope mount having incorporated therewith a telescope drive embodying the features of this invention.

Referring first to FIG. 1, there is illustrated somewhat schematically the general arrangement of a telescope and mount assembly. The telescope 10 is secured intermediate its ends to one end of a shaft 12 which extends freely through a sleeve 14 for longitudinal and rotational adjustment to desired position, where it is secured by the set screw 16. The end section of the shaft opposite the telescope slidably receives a counterweight 18 which functions, by adjustment along the shaft, to balance the weight of the telescope with respect to the polar axis shaft 20. This shaft is secured at one end to the sleeve 14 with its axis arranged parallel to the axis of the telescope. The polar axis shaft is mounted rotatably in the bearing 22. A radially projecting flange 24 on the bearing is mounted pivotally on the azimuth pin 26 supported by the pedestal base 28.

The present invention is directed to the controlled rotation of the polar axis shaft 20. The end of the polar axis shaft 20 opposite the sleeve 14 supports a gear 30 which meshes with the worm 32. The opposite end sections of the worm shaft 32' are supported in bearings 34 carried by the gear housing 36. One end of the worm shaft projects outwardly through its bearing and freely through aligned openings at the axial center of the ratchet plate 38 and the end wall 40 of a hollow motor housing. The ratchet plate is secured firmly to the gear housing 36 and is provided with a circular ratchet gear 42. The motor housing includes a cylindrical side wall 44 projecting from the end wall 40 toward the ratchet plate, and the edge of this cylindrical wall adjacent the ratchet plate is provided with a ratchet gear 46 matching the ratchet plate gear 42. These gears are urged resiliently together by such means as the spring 48 which is mounted upon the outer end of the worm shaft and is confined between the end wall 40 of the motor housing and the keeper ring 50 which is secured removably in an annular groove in the worm shaft.

It will be understood that the ratchet gears are arranged to permit rotation of the motor housing in one direction, by permitting the ratchet gears to slip, but to prevent rotation of the motor housing in the opposite direction.

A spiral spring 52 is confined within the motor housing. The inner end of the spring is secured to the worm shaft, while the outer end of the spring is secured to the motor housing. Thus, the spring may be tensioned by rotating the housing in the direction permitted by slippage of the ratchet gears.

The spring motor assembly may be replaced by such other types of flexible drive systems as an electric motor connected to the worm shaft 32' through a friction clutch.

The opposite end of the worm shaft 32' is connected to the input gear 54 of a gear reduction unit contained within the housing 56. This housing is secured firmly to the gear housing 36. The output gear 58 of the gear reduction unit is connected to a variable timer device T which functions to control the rotation of this gear, and hence the polar axis shaft.

Figure 2:
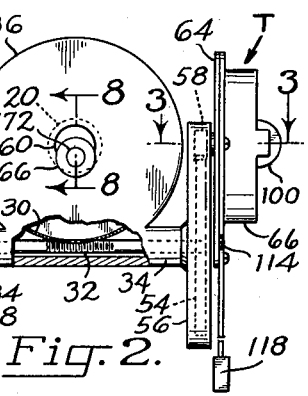
FIG. 2 is a view in front elevation, as viewed along the line 2—2 in FIG. 1, of the telescope drive embodying features of this invention, a portion being broken away to disclose details of internal construction.
Figure 3:
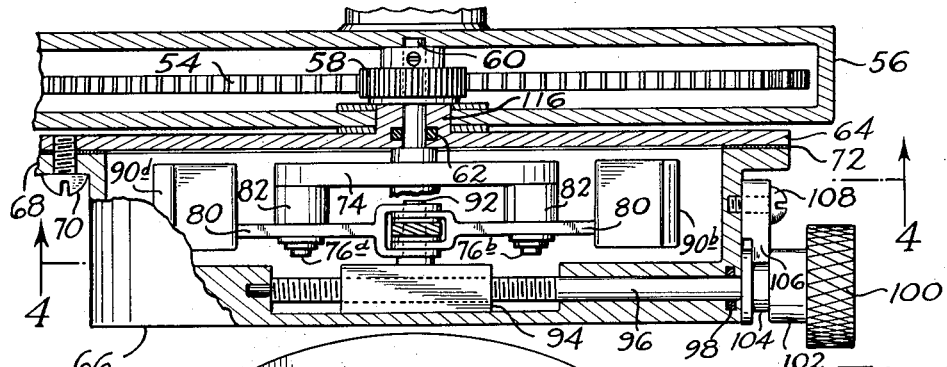
FIG. 3 is a fragmentary sectional view taken along the line 3—3 in FIG. 2.
Figure 4:
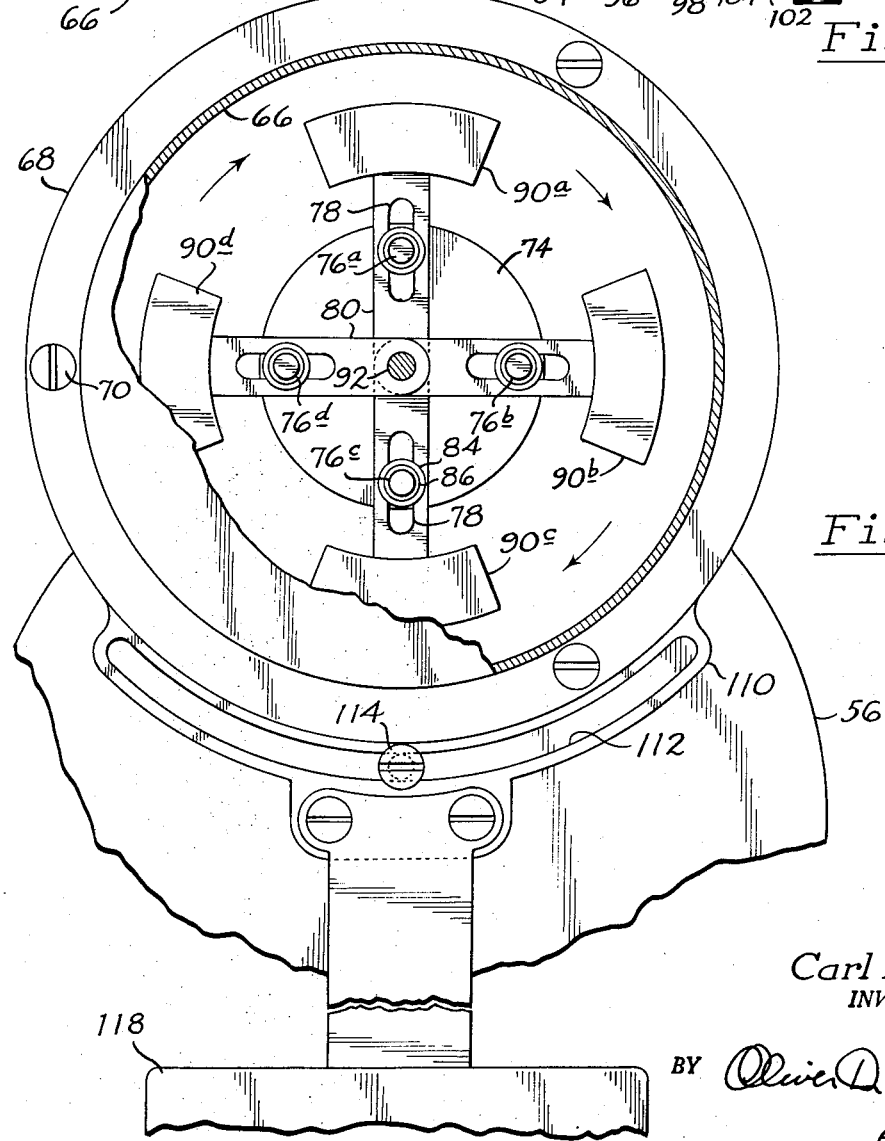
FIG. 4 is a sectional view taken along the line 4—4 in FIG. 3.

In the timer device illustrated in FIGS. 2–4 the gear 58 is secured to the output shaft 60 which extends through the liquid seal O-ring 62 mounted about an opening in the supporting plate 64 of the timer housing 66. This hollow housing is provided with a peripheral flange 68 which is perforated at circumferential intervals to register with tapped openings in the supporting plate 64 for reception of the securing screws 70. A sealing gasket 72 is interposed between the flange and plate to provide a liquid tight seal.

The timer housing preferably is supported adjustably on the gear reduction housing in a manner described in detail hereinafter.

The output shaft 60 of the gear reduction unit extends into the hollow timer housing and supports therein a driving plate 74. Mounted on the driving plate radially outward from its axis of rotation with the output shaft 60, is at least one driving pin. In the embodiment illustrated, there are four such driving pins 76a, 76b, 76c and 76d disposed at 90° intervals and extending parallel to the output shaft.

Each of the driving pins extends freely through a radially elongated slot 78 in an associated lever arm 80. Spacer sleeves 82 are mounted on the driving pins between the lever arms and driving plate, and the lever arms are confined on the pins between the sleeve and a washer 84 retained on the pin by such means as the keeper ring 86 removably secured in an annular groove in the pin.

The lever arms preferably are of equal length and they support at their radially outward ends the reaction heads, 90a, 90b, 90c and 90d, respectively, defined more fully hereinafter. The radially inward ends of the lever arms are connected rotatably to a common pivot shaft 92 which extends parallel to the axes of the drive pins 76 and which is secured to a hollow threaded sleeve 94. This sleeve receives the threaded section of the adjustment screw 96 which extends normal to the axis of the output shaft 60.

The adjustment screw is mounted rotatably at its inner end in a bearing socket formed in the housing 66 and extends outwardly through an opening in the housing. A liquid tight seal is provided by the O-ring 98. The outer end of the adjustment shaft carries a knurled knob 100 for hand manipulation, and the hub 102 of this knob is provided with an annular groove 104 which slidably receives the retained lug 106 secured to the housing 66 by such means as the screw 108. The retainer lug functions to prevent longitudinal displacement of the adjustment screw while permitting axial rotation, as will be understood.

As the adjustment screw is rotated in one direction or the other, the lever arm pivot shaft 92 carried by the sleeve 94 is moved on a line which extends across and normal to the axis of the output shaft 60. For example, in the arrangement illustrated in FIGS. 3 and 4 the pivot shaft 92 and the output shaft 60 are coaxial, the reaction heads 90 are spaced equally from this common axis and each of the driving pins 76 are equally distant radially outward from the pivot shaft 92. Now, if the adjustment screw 96 is rotated to move the lever arm pivot shaft 92 toward the left, for example, it will be seen from FIG. 4 that the distance between the pivot shaft 92 and the driving pin 76d shortens, with corresponding increase in the distance between the driving pin and the associated reaction head 90d. Simultaneously, the distance between the lever arm pivot shaft 92 and the driving pin 76b lengthens with corresponding decrease in the distance between the driving pin 76b and the associated reaction head 90b. The other lever arms are moved angularly in the direction of the right hand head 90b, slightly increasing the distance between the lever arm pivot shaft 92 and the driving pins 76a and 76c. However, it will be apparent that when the reaction heads are in substantially vertical position their leverage effect on the driving pins is negligible. Although one lever arm and reaction head assembly is sufficient for operation, more uniform operation is achieved with a multiplicity of assemblies.

It will be evident that the rotation of shaft 60 is not uniform throughout its 360° cycle. However, because of the magnitude of reduction through the gear reduction assembly 30, 32, 54 and 58, the non-uniformity of the greatly reduced rotation of the polar axis shaft is hardly detectable and, in any event, does not adversely affect the practical operation of the drive.

The reaction heads may be of various types. In the preferred embodiment, the timer housing 66 is completely filled with liquid such as water, oil, etc. and the reaction heads are chosen to be buoyant in the liquid. Thus, the reaction heads may be hollow bodies of metal, plastic, or other material, or they may be of cork or other relatively solid material having a density less than the liquid.

Assuming the reaction heads to be buoyant in a liquid, and the lever arms 80 arranged in the symmetrical manner illustrated in FIGS. 3 and 4, it will be seen that all of the leverage forces are in balance. Accordingly, with the spring 52 within the motor housing tensioned as described hereinbefore, the worm 32 will be rotated at a speed determined by the friction in the gear train and other parts of the moving assembly, as well as the resistance encountered by the reaction heads in moving through the liquid.

Assuming, now, that the adjustment screw 96 is rotated to displace the lever arm pivot shaft 92 toward the left, it will be seen that the left hand reaction head 90d is moved farther outward from the associated driving pin 76d and the right hand reaction head 90b is moved correspondingly closer to the associated driving pin 76b. The pivot shaft 92 also is moved correspondingly closer to the driving pin 76d and correspondingly farther from the driving pin 76b. Accordingly, although both reaction heads are equally buoyant, the greater mechanical leverage now afforded to the left hand reaction head by the outward displacement of the center of gravity of the lever arm assembly for head 90d, will propel the driving plate 74 in the clockwise direction of rotation illustrated, with a greater force than the opposing force offered by the right hand reaction head 90b, since the mechanical leverage of the latter has been proportionately reduced. Thus, the additional force supplied by the buoyant reaction heads as they pass through the left hand semi-circle, adds to the force of the spring 52 to effect an increase in the speed of rotation of the worm 32. This increases correspondingly the rotational speed of the engaging gear 30 and the connected polar axis shaft 20.

Conversely, if the adjustment screw 96 is rotated to move the lever arm pivot shaft 92 toward the right of the output shaft 60, the increased mechanical leverage afforded the reaction heads as they rotate clockwise through the right hand semi-circle, with corresponding decrease in mechanical leverage of the reaction heads, during travel through the left hand semi-circle, results in an increased resistance to clockwise rotation of the driving plate 74. This resistive force therefore subtracts from the force of the spring 52, with resulting decrease in the rotational speed of the worm 32 and hence the polar axis shaft 20.

It will be apparent that the timer housing may simply be filled with air and the reaction heads be hollow bodies filled with a gas lighter than air, to effect the mode of operation described hereinbefore.

Alternatively, the reaction heads may be constructed to be heavier than the liquid or air contained within the timer housing. In such event the mode of operation described hereinbefore merely will be reversed, i.e. increased speed of rotation of the worm 32 will be effected by moving the lever arm pivot shaft 92 toward the right of output shaft 60 and decreased rotation will be effected by moving the pivot shaft toward the left of the output shaft.

Means is provided for maintaining the timer housing 66 in a position in which the adjustment screw 96 is horizontal, in order that the lever arm pivot shaft 92 be adjustable in a horizontal plane. In the embodiment illustrated, this means comprises a flange 110 projecting radially from the lower end of the supporting plate 64 and provided with an arcuate slot 112. A bolt 114 extends freely through the slot and is secured in a tapped opening in the adjacent wall of the gear reduction unit housing 56. The timer housing is mounted pivotally on the gear housing 56 by means of the hollow hub 116 on the supporting plate 64. This hub extends rotatably through an opening in the gear housing and supports the output shaft 60 for rotation relative thereto. Spacer washers on the hub separate the gear 58 and plate 64 from the gear housing 56. Thus, the timer housing may be rotated on the axis of the output shaft 60 to level the adjustment screw 96, and then secured in position by tightening the bolt 114.

Alternatively, the timer housing may be adjusted automatically to level the screw 96. This is accomplished in the embodiment illustrated by suspending a counterweight 118 from a position on the flange 110 that lies on a plane which passes through the axis of output shaft 60 and is normal to the axis of adjustment screw 96. Thus, by loosening the bolt 114 slightly to permit free rotation of the housing 66, the counterweight maintains the screw 96 horizontal automatically during all movements of the entire assembly.

Figure 7:
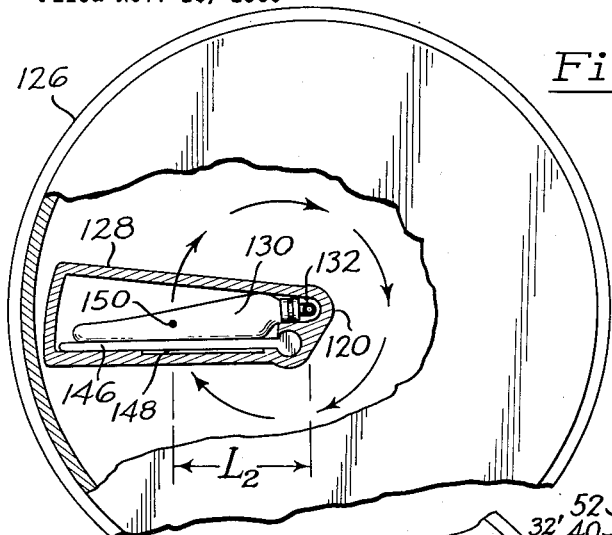
FIG. 7 is a fragmentary sectional view similar to FIG. 6 and showing the arrangement of parts in the nine o'clock position of rotation of the reaction heads.
Figure 6:
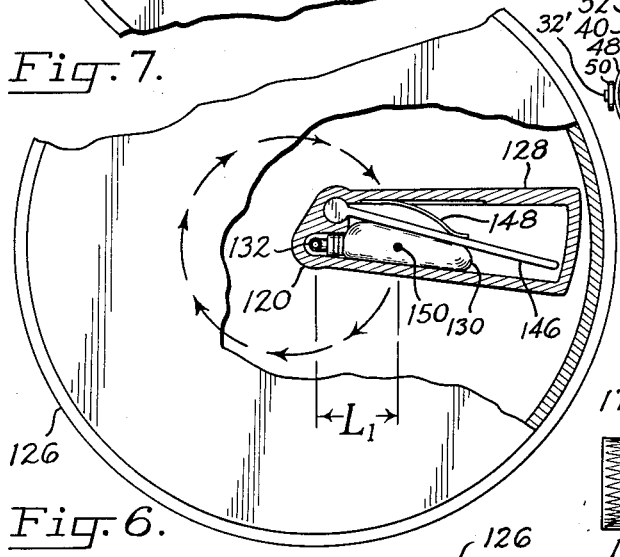
FIG. 6 is a fragmentary sectional view taken along the line 6—6 in FIG. 5 and showing the arrangement of parts at the three o'clock position of rotation of the reaction head.
Figure 5:
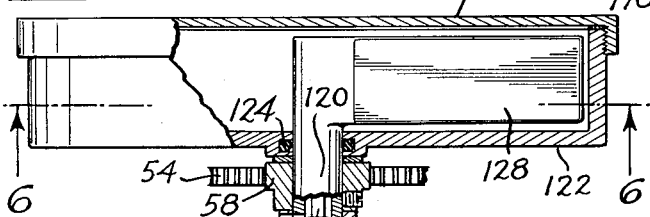
FIG. 5 is a plan view, partly in section, of a modified form of telescope drive embodying features of this invention.

Referring now to the alternative form of timer device illustrated in FIGS. 5, 6 and 7, the output gear 58 of the gear reduction unit supports a hollow output shaft 120. One end of this output shaft extends through an opening in the end wall 122 of the timer housing, a liquid tight seal being provided by the O-ring 124. The opposite end of the timer housing is removably sealed by the cap 126.

Supported by the hollow output shaft 120 within the timer housing is at least one reaction head, in the form of a hollow vane 128 which extends radially from the output shaft. The hollow shaft and vane communicate with each other for the free passage of air. Within the vane there is contained an inflatable sac 130 of rubber or other suitable elastic material, and this sac is connected through the conduit 132, which extends through the hollow output shaft, to a second inflatable sac 134 contained within a hollow cylinder 136 supported upon the opposite end of the output shaft 120. A piston 138 is contained within the hollow cylinder and is supported by the threaded piston rod 140 extending through a threaded opening in the cylinder cap 142 and provided at its outer end with a control knob 144.

A backing blade 146 preferably is contained within the hollow vane, and is biased resiliently, by such means as the very light spring 148, to maintain the blade in contact with the sac 130. The blade and spring may be omitted if desired.

In the preferred mode of operation in the embodiment illustrated in FIGS. 5, 6 and 7, the timer housing is completely filled with liquid, and a quantity of liquid also is contained within the sacs 130, 134 and connecting conduit 132. Thus, as the control knob 144 is rotated to move the piston 138 toward the output shaft 120, liquid is forced from the sac 134 through the conduit 132 and into the sac 130 contained within the vane 128. The sac 130 thus enlarges, displacing air from the space on the side of the blade 146 opposite the sac and exhausting the air through the hollow shaft 120 and cylinder 136 to the atmosphere. As more liquid is filled into sac 130 the center of gravity of the vane assembly moves radially outward from the output shaft 120.

For example, assuming the vane 128 to be rotating in the clockwise direction indicated by the arrows in FIG. 6, it will be seen that when it is in the horizontal, three o'clock position the blade 146 is disposed above the sac 130 and is urged downward by the combined forces of gravity and the spring 148. This combined force is resisted either by the head pressure of the liquid in the supply sac 134 or by a pressure exerted upon the supply sac by the piston 138. In either case the sac 130 is distended radially to a corresponding degree, establishing the center of gravity 150 at a point spaced a distance L1 radially outward from the axis of the hollow shaft 120.

However, it will also be seen from FIG. 7 that when the vane has been rotated to the nine o'clock position, the blade 146 is disposed under the liquid containing sac 130, and the force of gravity applied thereto is supplemented by the weight of the liquid contained in the sac. This combined force is opposed by the force of the spring 148. This spring, if used, is designed to provide a very light force which may be overcome either by the head pressure in the supply sac 134 or by a pressure exerted upon the supply sac by the piston 138. Accordingly, the additional weight of the liquid in the sac 130, together with the weight of the blade 146 which now opposes the spring, functions to deflect the blade downward to permit the fluid filled sac 130 to distend radially outward to a greater degree than in the opposite, three o'clock position. Accordingly, the center of gravity 150 of the vane assembly is displaced radially outward a distance L2 from the rotational axis of the output shaft, and this distance is greater than the distance L1.

The center of gravity of the vane assembly varies with the volume of liquid contained in the sac 130, as does the relative distances L1 and L2 from the rotational axis in the three and nine o'clock positions. Accordingly, the rotational speed of the worm 32 and hence the polar axis shaft 20 may be varied by appropriate manipulation of the control knob 144 to change the effective length of the lever arm formed by the vane assembly, in manner analogous to the embodiment of FIGS. 1–4 described hereinbefore.

As in the embodiment of FIGS. 1–4, the timer housing may be filled with liquid or air and the reaction head vane assembly may be arranged to be lighter or heavier than the medium in the timer housing.

Figure 8:
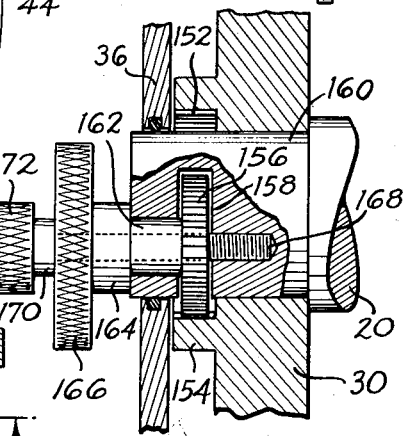
FIG. 8 is a fragmentary sectional view taken along the line 8—8 in FIG. 2 and showing a form of manual adjustment for the polar axis shaft.

Means also may be provided to accommodate manual adjustment of the polar axis shaft 20, preferably independent of the controlled drive system of either of the embodiments described hereinbefore. A preferred form of manual control is illustrated in FIG. 8, wherein the gear 30 is connected releasably to the polar axis shaft by means of the internal gear 152 formed on the inner surface of the hollow hub 154 projecting from the gear 30. This internal gear meshes with the smaller gear 156 positioned within a radial slot 158 formed in the reduced end section 160 of the polar axis shaft. The hub 162 of the gear 156 extends outwardly through a longitudinal bearing bore provided in the reduced section 160, and the axis of this bore is displaced radially from the axis of rotation of the polar axis shaft.

The outer end of the hub 162 is provided with an enlarged section 164 and a hand control knob 166 by which to effect rotation of the gear 156.

The gear 156 and hub assembly 162, 164, 166 is provided with an axial bore for receiving freely therethrough the threaded shank 168 of a clamping screw. The inner end of this threaded shank engages a tapped bore in the polar axis shaft. The outer end of the screw is provided with an enlarged shoulder 170 and a control knob 172.

When it is desired to secure the polar axis shaft 20 firmly to the gear 30 for controlled rotation of the polar axis shaft by the drive system, the control knob 172 of the clamping screw is rotated to draw the shoulder 170 into abutment with the control knob 166, whereupon the shoulder 164 is drawn into firm abutment with the end of the reduced section 160 of the polar axis shaft 20. Accordingly, the gear 156 is secured against rotation, thus locking the polar axis shaft to the gear 30 through the internal gear 152.

On the other hand, if it is desired to rotate the polar axis shaft 20 manually and independent of the controlled drive system, the clamping screw is loosened to permit manual rotation of the gear 156 by the hand control knob 166. Accordingly, as the gear 156 is rotated about its engaging gear 152, the polar axis shaft 20 is caused to rotate with it, relative to the gear 30. This manual adjustment of the polar axis shaft may be effected whether the controlled drive system is in operation or not.

From the foregoing, it will be apparent to those skilled in the art that various changes and modifications in the structural details described hereinbefore and various other structural arrangements may be devised to perform the basic mode of operation of the present invention. Such changes and modifications may be made without departing from the spirit of this invention and the scope of the appended claims.

Having now described my invention and the manner in which it may be used, what I claim as new and desire to secure by Letters Patent is:

1. A rotary drive, comprising a rotary shaft, a flexible motor for rotating the shaft, a lever member operatively connected to the shaft for rotation therewith on a substantially horizontal axis, and means associated with the lever member for establishing different distances between the shaft and the center of gravity of the lever member at positions displaced 180° from each other on a substantially horizontal axis.

2. The drive of claim 1 wherein the flexible motor comprises a helical spring operatively connected at one end to the rotary shaft and arranged to be tensioned for supplying rotary power to the shaft.

3. The drive of claim 1 wherein the means associated with the lever member is adjustable for varying said different distances over an operating range.

4. The drive of claim 1 wherein the means associated with the lever member comprises at least one lever arm supporting a reaction head at its radially outward end, pivot means engaging the radially inward end of the lever arm, and pivot support means arranged for adjustable movement on a substantially horizontal line normal to the rotary shaft, and connecting means interengaging the rotary shaft and lever arm.

5. The drive of claim 4 including pivoted mounting means for the pivot support means, and counterweight means on the mounting means for maintaining the pivot support means movable on a horizontal line.

6. The drive of claim 1 wherein the lever member includes a hollow reaction head and the means associated with the lever member comprises a quantity of fluid in the reaction head, the hollow head being arranged so that the fluid is displaced radially therein to different distances from the axis of rotation at positions displaced 180° from each other on a substantially horizontal axis.

7. The drive of claim 6 including a source of fluid supply communicating with the hollow head, and means for varying the quantity of fluid supplied to the hollow head.

8. The drive of claim 1 including manually operable means releasably interengaging the shaft and lever member for rotating the shaft selectively by the motor and by hand.

9. A rotary polar axis telescope drive, comprising a rotary shaft adapted to be operatively connected to the polar axis shaft of a telescope, a flexible motor for rotating the rotary shaft, a lever member operatively connected to the rotary shaft for rotation therewith on a substantially horizontal axis, and means associated with the lever member for establishing different distances between the rotary shaft and the center of gravity of the lever member at positions displaced 180° from each other on a substantially horizontal axis.

10. The drive of claim 9 wherein the flexible motor comprises a helical spring operatively connected at one end to the rotary shaft and arranged to be tensioned for supplying rotary power to the shaft.

11. The drive of claim 9 wherein the means associated with the lever member is adjustable for varying said different distances over an operating range.

12. In a telescope having a polar axis shaft, the combination therewith of a rotary shaft operatively connected to the polar axis shaft, a flexible motor for rotating the rotary shaft, a lever member operatively connected to the rotary shaft for rotation therewith on a substantially horizontal axis, and means associated with the lever member for establishing different distances between the rotary shaft and the center of gravity of the lever member at positions displaced 180° from each other on a substantially horizontal axis.

13. The combination of claim 12 wherein the flexible motor comprises a helical spring operatively connected at one end to the rotary shaft and arranged to be tensioned for supplying rotary power to the shaft.

14. The combination of claim 12 wherein the means associated with the lever member is adjustable for varying said different distances over an operating range.

References Cited in the file of this patent

UNITED STATES PATENTS

| | | |
|---|---|---|
| 395,002 | Saegmuller | Dec. 25, 1888 |

FOREIGN PATENTS

| | | |
|---|---|---|
| 1,353 | Great Britain | 1874 |